United States Patent
Merzon et al.

(10) Patent No.: US 9,398,248 B2
(45) Date of Patent: Jul. 19, 2016

(54) IDENTIFYING SERIES CANDIDATES FOR DIGITAL VIDEO RECORDER

(75) Inventors: Alan Merzon, San Jose, CA (US); Tim Herby, Los Altos, CA (US); Antonio Fontan, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 121 days.

(21) Appl. No.: 13/305,490

(22) Filed: Nov. 28, 2011

(65) Prior Publication Data

US 2013/0136423 A1    May 30, 2013

(51) Int. Cl.
| | |
|---|---|
| *H04N 5/76* | (2006.01) |
| *H04N 9/82* | (2006.01) |
| *H04N 21/4147* | (2011.01) |
| *H04N 21/466* | (2011.01) |
| *H04N 21/2747* | (2011.01) |
| *H04N 21/433* | (2011.01) |
| *H04N 21/458* | (2011.01) |
| *H04N 21/462* | (2011.01) |

(52) U.S. Cl.
CPC .............. *H04N 5/76* (2013.01); *H04N 9/8205* (2013.01); *H04N 21/2747* (2013.01); *H04N 21/4147* (2013.01); *H04N 21/4334* (2013.01); *H04N 21/4586* (2013.01); *H04N 21/4622* (2013.01); *H04N 21/4667* (2013.01)

(58) Field of Classification Search
CPC ............ H04N 5/782; H04N 21/47214; H04N 21/4334; H04N 5/76; H04N 5/765; H04N 5/781; H04N 5/85; H04N 21/84; H04N 9/8042; H04N 7/50; H04N 5/44543; G11B 27/105; G11B 19/02; G11B 27/28; G11B 27/34; G11B 2220/20; G11B 27/034
USPC .................................................. 386/291–299
See application file for complete search history.

(56) References Cited

U.S. PATENT DOCUMENTS

| | | | |
|---|---|---|---|
| 6,463,444 B1 | 10/2002 | Jain et al. | |
| 6,588,013 B1 * | 7/2003 | Lumley ................. | H04N 7/165 348/E7.063 |
| 7,421,455 B2 | 9/2008 | Hua et al. | |
| 2002/0032907 A1 | 3/2002 | Daniels | |
| 2002/0057893 A1 | 5/2002 | Wood et al. | |

(Continued)

OTHER PUBLICATIONS

Wang, et al., "Cataloging and Search Engine for Video Library", Retrieved at <<http://www.acs.org.au/documents/public/crpit/CRPITV2Wang.pdf>>, Selected papers from the Pan-Sydney workshop on Visualisation, vol. 2, 2000, pp. 97-98.

*Primary Examiner* — Nigar Chowdhury
(74) *Attorney, Agent, or Firm* — Aaron Chatterjee; Judy Yee; Micky Minhas

(57) ABSTRACT

Embodiments that relate to defining series for digital video recording are disclosed. One embodiment provides a method including receiving selection of a set of one or more video content series for which to automatically schedule recording updates, wherein each video content series is of a series type selected from a plurality of series types and each series type utilizes a corresponding update module selected from a plurality of update modules. The method further comprises receiving a trigger configured to trigger an updating of one or more series types, and for each video content series to be updated based upon the trigger received, obtaining a list of candidate video items for potential scheduling by executing the corresponding update module.

19 Claims, 4 Drawing Sheets

(56) References Cited

U.S. PATENT DOCUMENTS

| | | | |
|---|---|---|---|
| 2006/0253867 A1* | 11/2006 | Potrebic et al. | 725/50 |
| 2007/0154163 A1* | 7/2007 | Cordray | 386/52 |
| 2008/0120650 A1* | 5/2008 | Orihara et al. | 725/45 |
| 2008/0271075 A1* | 10/2008 | Kawai | 725/39 |
| 2008/0313146 A1 | 12/2008 | Wong et al. | |
| 2009/0138459 A1 | 5/2009 | Walter et al. | |
| 2009/0172742 A1* | 7/2009 | Weaver | 725/58 |
| 2009/0259519 A1* | 10/2009 | Cronin et al. | 705/10 |
| 2010/0158479 A1 | 6/2010 | Craner | |
| 2010/0306805 A1 | 12/2010 | Neumeier et al. | |
| 2013/0114940 A1 | 5/2013 | Merzon et al. | |

* cited by examiner

IDENTIFYING SERIES CANDIDATES FOR DIGITAL VIDEO RECORDER

BACKGROUND

Video content may be obtained from a variety of sources, including linear and non-linear sources. Linear content sources, such as broadcast television channels, provide content according to a specified schedule, whereas non-linear sources allow users to access available content on demand.

Digital video recorders (DVRs) may be utilized by television viewers to allow linear content to be consumed in an on-demand manner. DVRs may allow users to elect to record single instances of shows, or a series of episodes of a show by identifying the series. Users may locate such shows and series for recording by searching by title and/or series identification. After recording, a user may view a user-selectable list of recorded series and/or shows to choose a show for playback. In this manner, a DVR may provide a user with the option of watching linear content whenever and as often as desired.

SUMMARY

Embodiments are disclosed herein that relate to defining series and identifying candidate video items for automatic recording by a DVR. For example, one embodiment provides a method of identifying candidate video items for recording on a digital video recording device. The method includes receiving selection of a set of one or more video content series for which to automatically schedule recording updates, wherein each video content series is of a series type selected from a plurality of series types and each series type utilizes a corresponding update module selected from a plurality of update modules. The method further comprises receiving a trigger configured to trigger an updating of one or more series types, and for each video content series to be updated based upon the trigger received, obtaining a list of candidate video items for potential scheduling by executing the corresponding update module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
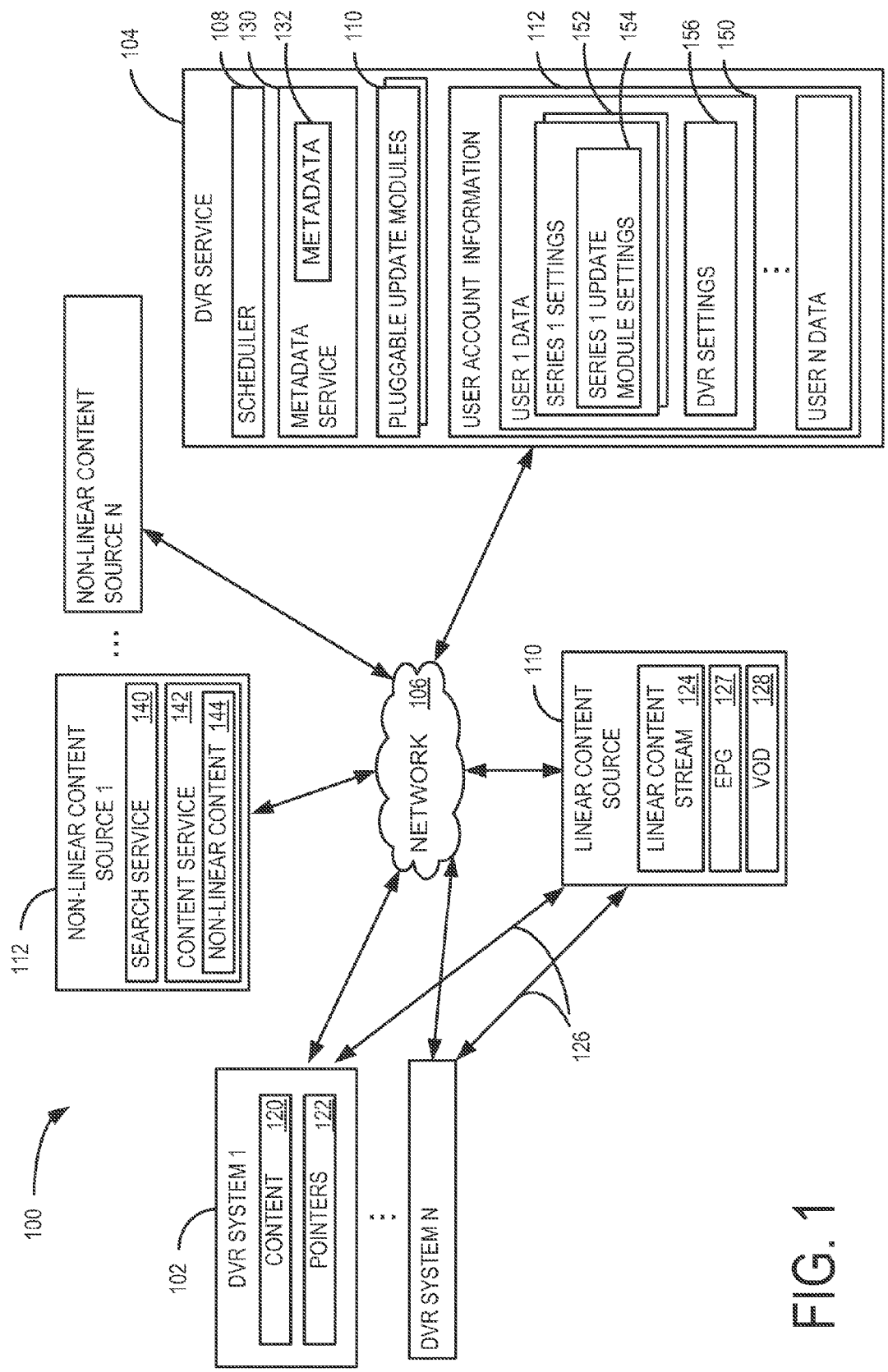
FIG. 1 shows an embodiment of an example use environment for a DVR system.

As mentioned above, a DVR system may be utilized by television viewers to allow linear content to be consumed in an on-demand manner. Current DVRs may allow users to elect to record a series of episodes of a show by identifying the series, for example, by searching by title and/or series identification. Upon selecting a series for recording, the automatic updating of the recording of the series may be triggered by receipt of an updated electronic programming guide (EPG) by the DVR system. In this manner, the recording of the series may automatically be kept up-to-date.

However, video content is increasingly available from sources other than television channels. For example, movies and television shows are becoming more commonly available via streaming from websites. Additionally, cable and satellite television providers also often provide on-demand content.

Current DVR systems may allow a user to access and/or record on-demand content available from the user's television provider, but such content may be available via a different user experience than linear content recordings. Further, current DVR systems may not allow a user to record and/or stream content from other locations such as websites. Thus, users wishing to view related non-linear content may have to seek out such content via other avenues, such as a through a computer network. Further, the definitions of series utilized by current DVR systems may be limited and not easily extensible.

Accordingly, embodiments are disclosed herein that relate to defining series other than pre-scheduled broadcast linear content for automatic recording by a DVR system. Briefly, the disclosed embodiments may allow virtually any algorithm configured to run when triggered and return a list of potential candidate video items to be used to locate video items to record as a series. Examples of such algorithms may include, but are not limited to, algorithms that define series by subject matter, by social network, by recommendation, by popularity, and the like. Such series may include either or both of linear content and non-linear content. The algorithm may pass the resulting list of candidates on to a scheduler that selects which candidates to schedule. The scheduler also may track recording history so that previously recorded candidates, candidates for which recording has been previously cancelled, and potentially other categories of candidates, provided by the algorithm are not again recorded. Through such algorithms, types of series ("non-linear series types") other than traditional, pre-scheduled linear content series that are recorded based upon series identification and periodic schedule, may be defined, recorded, and enjoyed in an integrated user experience with linear series.

It will be understood that a non-linear series type may utilize content obtained from a linear source, and potentially even multiple content items from a single linear series from a linear source. For example, a non-linear series may be defined as episodes of a series available from a linear content source that a particular user has never viewed, wherein the series may include repeats as well as new episodes. As another example, a non-linear series may be defined as only new episodes of a series available from a linear content source, such that repeat episodes are not recorded even if they have been previously recorded.

Embodiments are also disclosed that allow new algorithms, which also may be referred to herein as update modules, to be added to a DVR scheduling system as pluggable components. In such embodiments, new update modules that define new series types may be added by dropping in code that defines the update module. Such code may be discovered automatically and used immediately. Such a simple process for adding new update modules may allow differentiated offerings to be provided on a same service. For example, customers may be able to subscribe to a higher tier of service to gain access to more powerful series definitions and associated update modules. Further, third parties may be able to develop series definitions for a DVR service.

Prior to discussing these embodiments in more detail, an example use environment 100 is described with reference to FIG. 1. Use environment 100 comprises a plurality of DVR systems 102, illustrated as an arbitrary number n of DVR systems. Each DVR system 102 is connected to a remote DVR service 104 via a network 106. As discussed in more detail below, the remote DVR service 104 may be configured to schedule recordings of video items for each DVR system 102 via a scheduler 108 based upon candidates received from update modules 110 and user account information 112 stored on the remote DVR service 104 for each DVR system 102. The video items scheduled for recording may be obtained from one or more linear content sources 114, and also one or more non-linear content sources 116.

It will be understood that, in other embodiments, tasks described herein as being performed by DVR service 104 may be performed locally on each DVR system 102, or distributed between the DVR service 104 and each DVR system 102. More generally, while described in the context of a remote DVR service that schedules recordings for client devices, it will be understood that the embodiments disclosed herein may be implemented in any other suitable use environment. For example, in some embodiments, both scheduling and recording may be performed remotely from client playback devices. In such an embodiment, the recording device may be implemented as a cloud-based service that may be shared across multiple users and/or that allocates storage per user. Such a recording service may or may not be combined with a scheduling service. As another non-limiting example, in other embodiments, scheduling-related tasks may be performed on client devices, while recording is implemented as a cloud-based service.

Each DVR system 102 is configured to record scheduled programs, and also to play back recorded programs upon user request. Each DVR system therefore may comprise recorded video content 120. Further, each DVR system may be configured to store pointers 122 that point to available non-linear content. With regard to non-linear content, as such content may be available on-demand, the content may be accessed at any time without recording a local copy. Therefore, in such instances, local storage space may be conserved by storing a pointer 122 to a non-linear content item, rather than a copy of the non-linear content item. In other instances, a copy of a non-linear content item may be stored instead of a pointer, e.g. if a non-linear content item is due to expire (e.g. will no longer be available at a content source), if a network connection between a DVR system and a non-linear content source is unreliable, if local storage is preferred by a user, etc. In either case, this may allow DVR systems 102 to present linear and non-linear content in an integrated user experience.

The linear content source 114, as mentioned above, provides a stream of linear scheduled content 124, such as a plurality of television broadcasts, to each DVR system 102. The linear content source may provide such content to each DVR system 102 via a direct channel 126, and/or via computer network 106. Examples of suitable linear content sources 114 include, but are not limited to, cable television and satellite television providers. The linear content source 114 further may provide other information to DVR systems 102, such as an electronic programming guide 127 ("EPG"), and non-linear content by video on demand (VOD) 128. The direct channel 126 may take the form of a coaxial cable, fiber optic cable, satellite link, and/or any other communication channel suitable for delivering linear content. While the embodiment of FIG. 1 depicts a single linear content source 114 for clarity, it will be understood that DVR systems 102 also may receive linear content from more than one linear content source.

The DVR service 104 may further comprise a metadata service 130 for storing and searching metadata related to content available for recording and/or playback. The metadata service 130 may be configured to receive content requests from the scheduler 108, and in response, to obtain information regarding the availability of content that matches the requests. The metadata service 130 may query locally stored metadata 132 and/or external content sources. Locally stored metadata 132 may include previously received information, such as information from EPG 127 from linear content source 114, for example.

Each external non-linear content source 116 likewise may include a search service 140 with which the metadata service 130 can interface to discover available content on the non-linear content source through queries. Further, each external non-linear content source also comprises a content service 142 configured to deliver non-linear content 144 to end-user devices, such as DVR systems 102. Examples of suitable non-linear content sources include, but are not limited to, television content web sites, movie content web sites, user-uploaded video web sites, and social networking web sites.

As mentioned above, in some embodiments, each update module 110 comprises logic that may be used to locate potential candidate video items (e.g. by presentation time/channel, network location/URL, and/or any other suitable information) to record as a part of a series. It will be understood that each candidate may or may not eventually be recorded, and the decision regarding whether to schedule the recording of each identified candidate may be performed by the update module, by a different module (e.g. scheduler 108), by logic residing on a DVR system 102, and/or by any other suitable module. It further will be understood that the candidate video items may comprise individual episodes/shows, and also may comprise series of shows in some embodiments.

The user account information 112 utilized by the DVR service 104 comprises information that allows the update modules 110 to identify candidate video items for each series defined by a user. FIG. 1 depicts user account information stored for an arbitrary number N of users, and illustrates example data stored for "user 1" as user 1 data 150. User 1 data 150 comprises series settings 152 for each DVR series defined by user 1. The series settings 152 for a first series ("series 1") are shown at the top of a stack of series settings to illustrate that a plurality series are defined and recorded by user 1. The series settings 152 for each series includes update module settings 154 that comprise information to be provided to an update module 110 specified by the series settings 152 for locating candidates. The user account information also comprises DVR settings 156 that specify settings to be applied across all of a user's defined series.

Each update module may utilize similar or different settings than other update modules, and the update module settings 154 may have any suitable format. For example, in some embodiments, the update module settings 154 may comprise a single binary large object (BLOB) field that is parsed into a settings object by the update module 110 when triggered. In such an embodiments, the settings definition may be opaque to other components of the DVR service 104. In other embodiments, the update module settings 154 may have any other suitable form.

As a more detailed example of series settings 152 and update module settings 154, a selected update module 110 may be configured allow a user to define a series as an RSS (RDF Site Summary, or Really Simple Syndication) feed provided by a favorite celebrity in which the celebrity provides a feed of recommended video items. The user's series settings for such a series may identify the particular update module 110 that identifies candidate video items for an RSS-type series, while the update module settings 154 may comprise an identity of the particular subject matter (e.g. the specific RSS feed) for which to search for series candidates. In this manner, different user-defined series (e.g. RSS feeds of different celebrities) may utilize a common update module 110 by providing different update module settings 154 (e.g. different RSS feed identities) to the common update module 110.

Each update module 110 may be identified by a different identifier. Such an identifier may be defined in an update module class and discovered as the class/DLL (dynamically linked library) is loaded. Such an identifier may or may not be human-readable. In the event that two update modules inadvertently share an identifier, the resulting ID collision may be handled in any suitable manner. For example, in some embodiments, in the event of an ID collision, the first update module to use that identifier may take priority over the second.

Each update module 110 may access the metadata service 130 as well as the series settings 152 and DVR settings 156 for each user to help locate candidate video items. As mentioned above, the metadata service 130 may search locally stored information, as well as remotely stored information, to locate candidate video items for a series. In some embodiments, the metadata service 130 may be configured to return video item listings permitted for the particular user account for which a series is being updated to the exclusion of unpermitted items. Likewise, access of the update modules 110 to the series settings 152 and DVR settings 156 may be performed via a set of application programming interfaces (APIs) provided by the DVR scheduler. In this manner, the implementation of each update module 110 may be self-contained, thereby facilitating the addition of new update modules 110 for new series types.

It will be understood that an update module may obtain data related to video content from sources other than the metadata service 130. As non-limiting examples, an update module may obtain data from the Internet (e.g. from an RSS feed) and/or from stored personalized data (e.g. data regarding what a user has previously recorded and played). As a more specific example, an update module may be configured to record sports games of a specified team only if an opposing team has a winning record. In this case, the update module may access sports information via the Internet to obtain data related to team statistics.

New update modules 110 may be added to the DVR service 104 in any suitable manner. For example, update modules 110 may be configured at build time, and/or may be discovered at runtime. Where discovered at runtime, update modules 110 may be discovered by performing a runtime search for classes implementing a specific common interface. In some embodiments, the build-time configured update modules may have no extra access over the run-time discovered algorithms, and components of the DVR service 104 that interact with the update modules 110 may interact with the update modules based upon the common interface.

Figure 2:
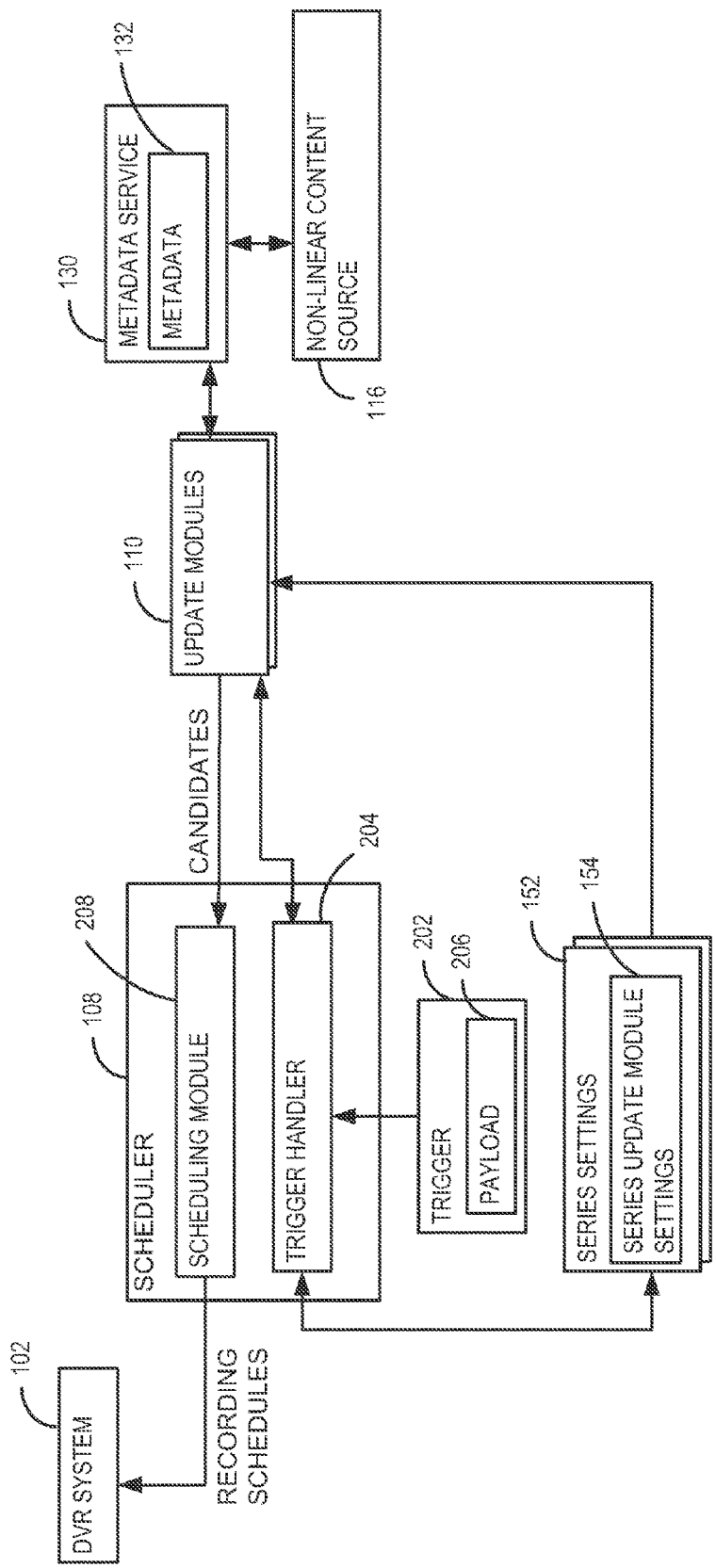
FIG. 2 shows an embodiment of a method of updating a recording schedule for a DVR system.

FIG. 2 illustrates data flow within and into/out of the DVR service 104 during a series update process. Updating begins upon receipt of a trigger 202 at a trigger handler 204 on DVR service 104. Logically, the trigger handler 204 may be a part of scheduler 108, or of any other suitable component of DVR service 104. Any suitable type of event may be used to trigger a search for candidate video items when scheduling a series recording update, and in some embodiments, different types of triggers may trigger different update modules 110. Examples of suitable trigger types include, but are not limited to, EPG updates, time-based triggers such as user-initiated scheduling updates and timers, and external event-based notifications (e.g. from a social networking web site). In other embodiments, a single trigger type may trigger all update modules.

Further, in some embodiments, the trigger 202 may comprise a payload 206 that contains information regarding changes in state that have occurred since a prior trigger of the same type was issued. As more specific examples, a payload of an EPG update trigger may comprise an updated EPG; a payload of a social network notification may comprise identities of users that have performed relevant activities; a payload of a timer may comprise an elapsed time since a previous trigger; and a payload of an RSS feed trigger may comprise information regarding a most-recent update made by the RSS feed originator. In other embodiments, a trigger may not comprise such a payload.

Upon receipt of a trigger, the trigger handler 204 may determine, based upon the series settings of a user, whether any series defined by that user is to be updated. For example, the trigger handler 204 may first determine whether any series is configured to be triggered by the trigger received. Further, in some embodiments, for each series configured to be triggered by the trigger received, the trigger handler 204 also may determine via the payload 206 whether the changes that have occurred since the last trigger of that type affect each series configured to be triggered by the received trigger. Any series that meet both of these conditions may be updated by executing the corresponding update module. In other embodiments, any series configured to be updated by the trigger received may be updated without regard to whether changes since the last trigger affect that series.

Continuing with FIG. 2, the trigger handler 204 may launch each triggered update module 110 based upon the series settings 152 for each relevant series. Each executed update module 110 then may receive series settings 152 for the relevant series and parse the update module settings 154 to obtain information specific for the series instance being updated. Each executed update module 110 may then query the metadata service 130 with the update module settings 154. The metadata service 130 may search locally stored metadata, and also may forward queries to remote content sources (e.g. non-linear content sources 116) to locate candidate video items for recording. After performing such queries, the metadata service 130 may return the results to the relevant update module 110 to form a list of candidate video items. The update module 110 then may forward the list of candidate video content items to a scheduling module 208 of the scheduler, which may schedule recordings and provide a recording schedule to a corresponding DVR system 102.

In some embodiments, each update module 110 may be configured to prioritize candidates before forwarding the candidates for scheduling. For example, if two candidates are scheduled to record at the same time but only one tuner is available, then the DVR system will select the higher priority candidate for recording. Further, the DVR service 104 may be configured to allow each instance of an update module to be prioritized against each other. Thus, a higher priority series may be scheduled first, and then a lower priority series may be scheduled if tuners are still available.

The use of multiple algorithms that define series in different manners may increase the possibility of a show being covered by multiple series at a time. Therefore, each DVR system 102 may be configured to allow a scheduled or recorded show to belong to multiple series at one time. Further, this multiplicity may be displayed to a user in a user interface so that the user may know where the show is actually coming from. Cancellations and deletions of series and recorded shows may be handled in any suitable manner. For example, in some embodiments, if any individual series is cancelled, the scheduled recording may remain active until all parent series are cancelled. Likewise, if an individual scheduled recording or recorded show is canceled, the show is removed from all of its parent series.

In addition to generating candidates, update modules also may have "hooks" that allow them to interact with other parts of the DVR lifecycle. Examples of such hooks include the ability to run immediately after an account has reconciled to trigger other accounts (e.g. based upon schedule data and/or DVR data (including DVR data across accounts)) and the ability to be notified when schedules are canceled and take actions that can influence future candidates generated by an algorithm. Likewise, if a DVR system 102 fails while recording a video item, the update module may be informed of the failed recording so that the item is not filtered from future candidate lists. Such mechanisms thus may allow update modules to not only determine candidate items for recording, but also to influence the workflow of the DVR system 102.

Other non-limiting examples of hooks are as follows. First, an algorithm may include a hook configured to construct relevant data at series creation. In the case of a social network-based update module, a hook may store information in a table that the user creating the series is following another user's subset of recordings. Another hook may allow such data to be cleaned up upon cancellation of a series. Also, a hook may allow recording of a previously-scheduled video content item to be stopped and/or deleted based upon events occurring in the presentation depending on a user's settings. As a more specific example, if a user wishes not to view games that a selected team does not win, such a hook may allow the recording to be deleted based upon the final score of the game as determined by the update module after recording is completed.

In some embodiments, the DVR service 104 and/or DVR systems 102 may comprise a mechanism to blacklist particular series (or other groupings of series, such as genres) that a user may not want automatically recorded. For example, if a celebrity repeatedly recommends episodes of a particular situation comedy show that a user does not wish to record, the user may be provided an option when deleting the show regarding whether to stop recording any episodes of the show if it appears in that series, or in any series in the future. It will be understood that such a filter may be applied globally across all series, or locally to the series from which the show was deleted.

Similar blacklisting may be used in other implementations. For example, in some embodiments, a user may be able to promote an episode of a show that a user enjoys to a series recording. In such an embodiment, upon promotion of the show to a series, the promotion mechanism also may add the series to a blacklist that applies non-globally to other series so that episodes of that particular show may not record as a part of other series. This may help, for example, to avoid confusion from having older episodes of the show mixed with newer episodes, and therefore may help to avoid user confusion.

Figure 3:
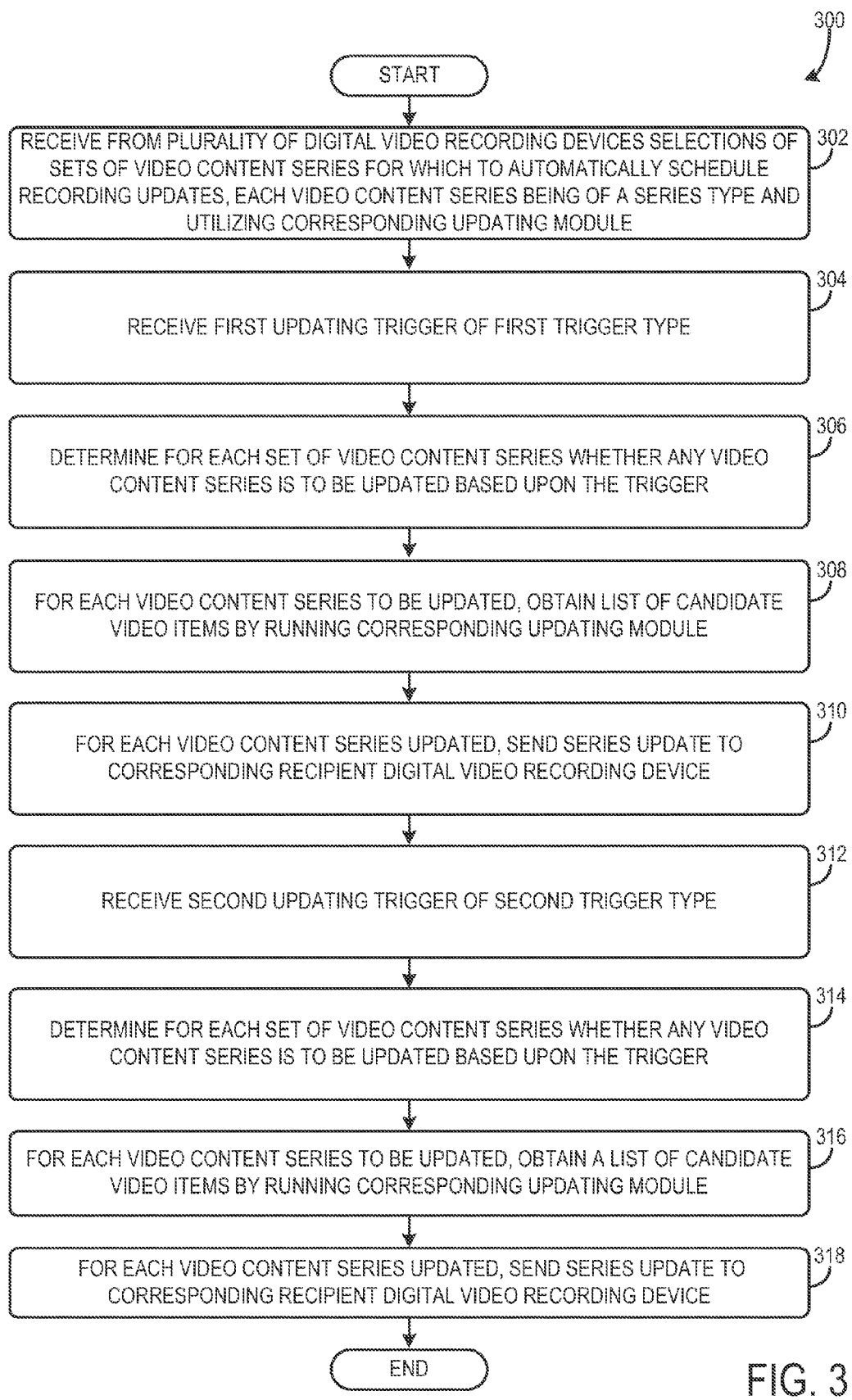
FIG. 3 shows an embodiment of a logical architecture of a DVR system comprising a plurality of update modules configured to update a plurality of corresponding series types.

FIG. 3 shows a flow diagram depicting an embodiment of a method 300 locating candidate video items for recording as a part of DVR series. Method 300 is presented in the context of updating two different series of different types, but it will be understood that the concepts described may be applied to any suitable number of and/or different types of series. Further, while disclosed in the context of a multi-user DVR service, it will be understood that the method 300 also may be performed on an individual DVR system, or distributed between an individual DVR system and a network-accessible service.

Method 300 comprises, at 302, receiving from a plurality of digital video recording devices selections of sets of video content series for which to automatically schedule recording updates, wherein each video content series has a series type and utilizes a corresponding update module for that series type. It will be understood that the series of each set may change over time as users make additional selections to add/delete series from that user's set.

Method 300 further comprises, at 304, receiving a first updating trigger of first trigger type, wherein the updating trigger is configured to trigger the updating of series recording schedules of one or more series types. Upon receiving the first updating trigger, method 300 optionally comprises, at 306, determining whether any video content series is to be updated based upon the trigger. As mentioned above, such determination may be made based upon whether a series is of a type that is triggered by the type of trigger received, and/or upon whether changes have taken place that affect that particular series instance (e.g. from information contained in a trigger payload). It will be understood that, in some embodiments, a single type of trigger may be utilized Likewise, in some embodiments, a trigger may not have an accompanying payload.

After determining those video content series that are to be updated, method 300 comprises, at 308, obtaining a list of candidate video items for each video content series to be updated by running the corresponding update module, and then at 310, sending a first series update recording schedule to a corresponding recipient digital recording device. It will be understood that process 306 may be skipped in some embodiments, for example where a single trigger is used to trigger all update modules.

Continuing, method 300 comprises, at 312, receiving a second updating trigger of second trigger type, wherein the updating trigger is configured to trigger the updating of series recording schedules of one or more series types. Upon receiving the second updating trigger, method 300 comprises, at 314, determining whether any video content series is to be updated based upon the second updating trigger. As mentioned above regarding process 306, process 314 may be skipped in some embodiments. After determining those video content series that are to be updated, method 300 comprises, at 316, obtaining a list of candidate video items for each video content series to be updated by running the corresponding update module, and then at 318, sending a second series update recording schedule to a corresponding recipient digital recording device. It will be understood that the first and second series updates may be sent to the same or different DVR systems. It further will be understood that the relative order of the first and second triggers shown in FIG. 3 are presented for the purpose of example and are not intended to be limiting, as the triggers could be received concurrently and/or at any relative time separation.

The above described methods and processes may be tied to a computing system including one or more computers. For example, referring again to FIG. 1, each DVR system 102 and the DVR service 104 may be implemented as a computer application, computer service, computer API, computer library, and/or other computer program product.

Figure 4:
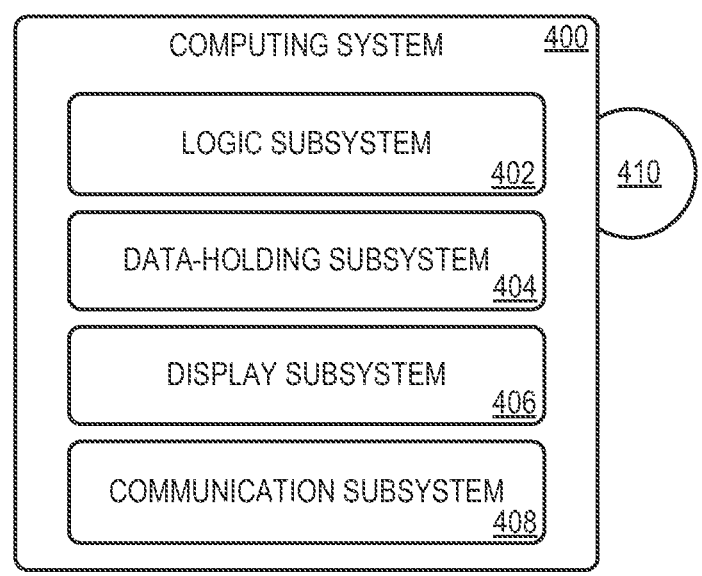
FIG. 4 shows a block diagram of an embodiment of a computing system.

FIG. 4 schematically shows a nonlimiting computing system 400 that may perform one or more of the above described methods and processes. Computing system 400 is shown in simplified form. It is to be understood that virtually any computer architecture may be used without departing from the scope of this disclosure. In different embodiments, computing system 400 may take the form of a mainframe computer, server computer, desktop computer, laptop computer, tablet computer, home entertainment computer, network computing device, mobile computing device, mobile communication device, gaming device, remote control, etc.

Computing system 400 includes a logic subsystem 402 and a data-holding subsystem 404. Computing system 400 may optionally include a display subsystem 406, communication subsystem 408, and/or other components not shown in FIG. 4. Computing system 400 may also optionally include user input devices such as keyboards, mice, game controllers, cameras, microphones, remote control units, head-mounted displays, and/or touch screens, for example.

Logic subsystem 402 may include one or more physical devices configured to execute one or more instructions. For example, logic subsystem 402 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 402 may include one or more processors that are configured to execute software instructions. Additionally or alternatively, logic subsystem 402 may include one or more hardware or firmware logic machines configured to execute hardware or firmware instructions. Processors of logic subsystem 402 may be single core or multicore, and the programs executed thereon may be configured for parallel or distributed processing. Logic subsystem 402 may optionally include individual components that are distributed throughout two or more devices, which may be remotely located and/or configured for coordinated processing. One or more aspects of logic subsystem 402 may be virtualized and executed by remotely accessible networked computing devices configured in a cloud computing configuration.

Data-holding subsystem 404 may include one or more physical, non-transitory, devices configured to hold data and/or instructions executable by logic subsystem 402 to implement the herein described methods and processes. When such methods and processes are implemented, the state of data-holding subsystem 404 may be transformed (e.g., to hold different data).

Data-holding subsystem 404 may include removable media and/or built-in devices. Data-holding subsystem 404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 410, which may be used to store and/or transfer data and/or instructions executable to implement the herein described methods and processes. Removable computer-readable storage media 410 may take the form of CDs, DVDs, HD-DVDs, Blu-Ray Discs, EEPROMs, and/or floppy disks, among others.

It is to be appreciated that data-holding subsystem 404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module" and "program" may be used to describe an aspect of computing system 400 that is implemented to perform one or more particular functions. In some cases, such a module or program may be instantiated via logic subsystem 402 executing instructions held by data-holding subsystem 404. It is to be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure, or such display devices may be peripheral display devices.

When included, communication subsystem 408 may be configured to communicatively couple computing system 400 with one or more other computing devices. Communication subsystem 408 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of identifying candidate video items for recording on a digital video recording device, the method comprising:
   receiving selection of a set of one or more video content series for which to automatically schedule recording updates, each video content series being of a series type selected from a plurality of series types and each series type utilizing a corresponding update module selected from a plurality of update modules, each update module defining a different algorithm for searching for candidate video items, wherein one or more update modules are configured to identify candidate video items from a broadcast content source and one or more update modules are configured to identify candidate video items from a computer network-accessible web content source;
   receiving one or more triggers for updating of a plurality of video content series;
   for a first video content series, executing a first update module selected from the plurality of update modules and using first series settings;
   for a second video content series, executing the first update module using second series settings; and
   for a third video content series, executing a second update module selected from the plurality of update modules and using third series settings.

2. The method of claim 1, wherein receiving selection of the set of one or more video content series comprises receiving selection of a plurality of sets of one or more video content series from a corresponding plurality of remotely located digital video recording devices.

3. The method of claim 1, further comprising determining a series update recording schedule for updating each video content series to be updated, and sending the series update recording schedule to a remote digital video recording device.

4. The method of claim 1, further comprising determining whether any video content series of the set of one or more video content series is to be updated based upon the trigger received before obtaining the list of candidate video items.

5. The method of claim 4, wherein the video content series is defined by one or more of subject matter, social network, recommendation and popularity.

6. The method of claim 1, wherein each trigger comprises one or more of a time-based trigger, an external event-based trigger, and an electronic programming guide update trigger.

7. The method of claim 1, wherein executing each update module comprises providing update module settings to the update module, the update module settings comprising information regarding subject matter for which to search.

8. The method of claim 1, further comprising receiving a new update module corresponding to a new series type.

9. A computing system, comprising:
   a logic subsystem;
   a communication subsystem; and
   a data-holding subsystem comprising stored instructions executable by the logic subsystem to:
      receive, from each digital video recording device of a plurality of digital video recording devices, selection of a set of one or more video content series for which to automatically schedule recording updates, each video content series being of a series type selected from a plurality of series types and each series type utilizing a corresponding update module selected from a plurality of update modules, each update module defining a different algorithm for searching for candidate video items, wherein one or more update modules are configured to identify candidate video items from a broadcast content source and one or more update modules are configured to identify candidate video items from a computer network-accessible web content source;
      receive one or more triggers for updating of a plurality of video content series;
      determine for each set of one or more video content series whether any video content series is to be updated based upon the trigger received;
      for a first video content series, execute a first update module selected from the plurality of update modules and using first series settings;
      for a second video content series, execute the first update module using second series settings;
      for a third video content series, execute a second update module selected from the plurality of update modules and using third series settings;
      and
      for each video content series updated, send a series update recording schedule to a corresponding recipient digital video recording device.

10. The computing system of claim 9, wherein the trigger comprises a trigger type, and wherein the instructions are executable to determine whether any video content series of each set of one or more video content series is to be updated by determining whether any video content series is configured to be triggered by the trigger type of the trigger received.

11. The computing system of claim 10, wherein each trigger comprises one or more of a time-based trigger, an external event-based trigger, and an electronic programming guide update trigger.

12. The computing system of claim 9, wherein each trigger comprises a payload containing information regarding changes that have occurred since a previous trigger.

13. The computing system of claim 12, wherein the instructions are executable to determine whether any video content series of each set of one or more video content series is to be updated by,
   for each video content series, determining whether the changes that have occurred affect that video content series.

14. The computing system of claim 9, wherein the instructions are executable to run each update module by providing update module settings to the update module, the update module settings comprising an identity of subject matter for which to search.

15. A method of identifying candidate video items for recording on a digital video recording device, the method comprising:
   receiving selection of a first video content series and a second video content series to automatically schedule for recording updates, the first video content series and the second video content series being of different series types selected from a plurality of series types and respectively utilizing a first update module and a second update module, the first update module and the second update module each selected from a plurality of update modules defining different algorithms for searching for candidate video items, wherein the first update module is configured to identify candidate video items from a broadcast content source and the second update module is configured to identify candidate video items from a computer network-accessible web content source;

receiving a trigger of a first trigger type;

in response to the trigger of the first trigger type, obtaining a first list of candidate video items from a broadcast content source for potential scheduling in the first video content series by executing the first update module utilizing first series settings;

receiving a trigger of a second trigger type; and in response to the trigger of the second trigger type, obtaining a second list of candidate video items from a non-broadcast computer network accessible web content source for potential scheduling in the second video content series by executing the second update module utilizing second series settings.

16. The method of claim 15, wherein the selection of the first video content series is received from a first user, and the selection of the second video content series is received from a second user.

17. The method of claim 15, further comprising, before obtaining the first list of candidate video items, determining whether the first video content series is configured to be triggered by the trigger received.

18. The method of claim 17, wherein each trigger comprises a payload containing information regarding changes that have occurred since a previous trigger of a same trigger type, and wherein the method further comprises, before obtaining the first list of candidate video items, determining whether the changes that have occurred affect the video content series based upon the payload.

19. The method of claim 15, wherein the first trigger type and the second trigger type each comprise one of a time-based trigger, an external event-based trigger, and an electronic programming guide update trigger, and wherein the second trigger type is different than the first trigger type.

* * * * *